United States Patent [19]

Riley

[11] 4,439,094
[45] Mar. 27, 1984

[54] METHOD FOR STORING WHEELED FRAMES OF DETACHABLE CARGO CONTAINER TYPE TRAILERS

[75] Inventor: Joseph L. Riley, Milwaukie, Oreg.

[73] Assignees: Scott S. Corbett, Jr.; Lynn F. Perrott, both of Portland, Oreg.

[21] Appl. No.: 298,747

[22] Filed: Sep. 2, 1981

Related U.S. Application Data

[62] Division of Ser. No. 69,563, Aug. 24, 1979, abandoned.

[51] Int. Cl.³ ............................................. A45F 3/10
[52] U.S. Cl. ................................ 414/786; 414/266; 414/732
[58] Field of Search ............... 414/276, 234, 235, 248, 414/258, 11, 263, 103, 783, 754, 782, 678, 340, 345, 346, 745–748, 429, 786; 211/64, 28; 410/5, 6, 32, 3, 1

[56] References Cited

U.S. PATENT DOCUMENTS

| 626,535 | 6/1899 | Gradmiller | 410/3 |
| 3,370,723 | 2/1968 | Czarnecki et al. | 414/754 |
| 3,809,234 | 5/1974 | Kurick | 410/32 |
| 4,377,369 | 3/1983 | Johnson, Jr. | 410/32 |

FOREIGN PATENT DOCUMENTS 472828  5/1975  U.S.S.R. ............................. 410/5

Primary Examiner—Lawrence J. Oresky
Attorney, Agent, or Firm—Oliver D. Olson

[57] ABSTRACT

The wheeled frame remaining after removal therefrom of the detachable cargo container, is gripped by clamping mechanism of a carrying unit mounted on a tractor or lift truck, then elevated above the ground and pivoted from its normal horizontal disposition to vertical position, and then transported to a multiple storage unit where it is deposited and retained in said vertical position removably in one of a plurality of compartments making up the storage unit. A plurality of such wheeled frames may be stored in this manner by deposit in successive ones of the compartments, and they are removed from the compartment in the reverse order of deposit.

5 Claims, 7 Drawing Figures

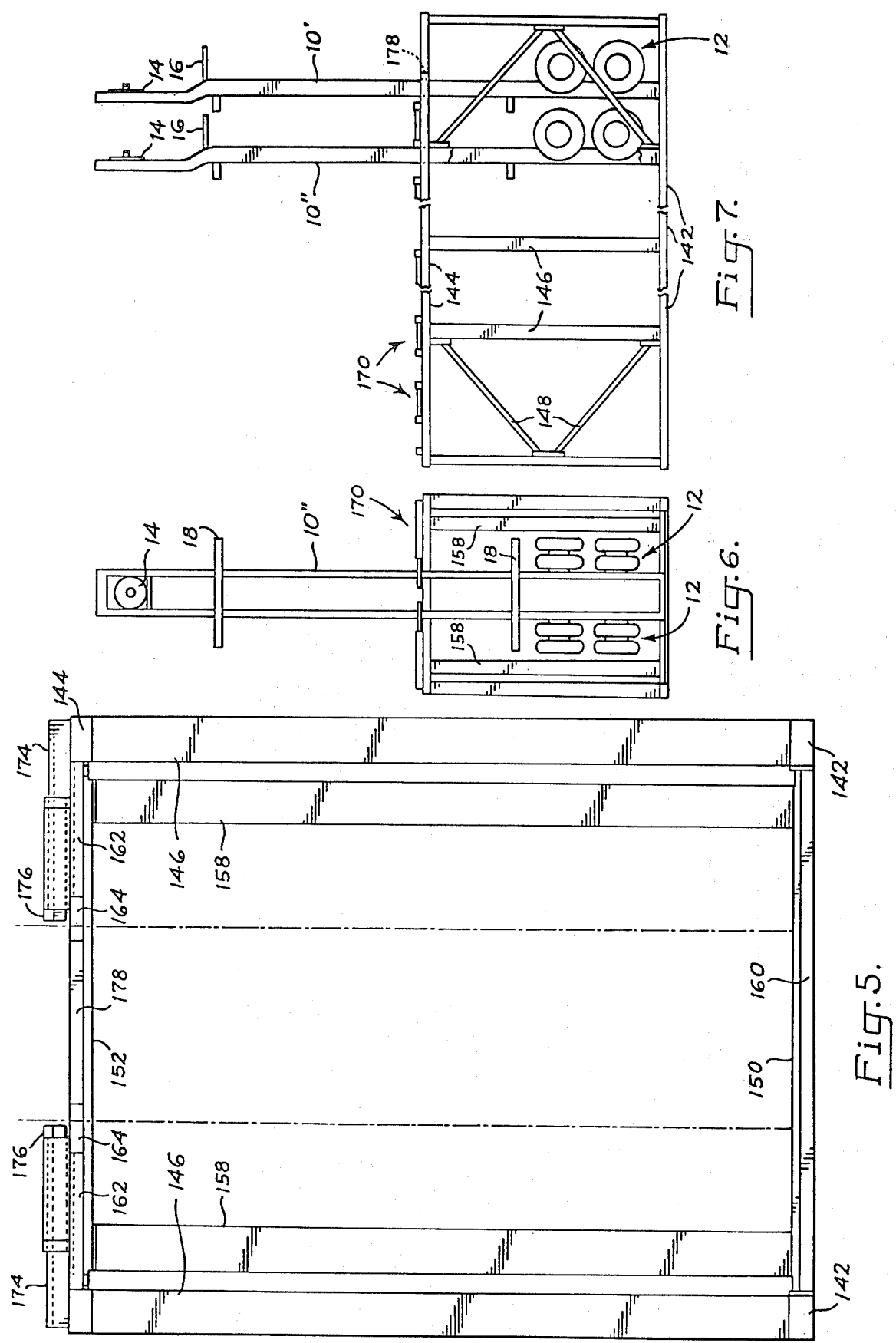

4,439,094

METHOD FOR STORING WHEELED FRAMES OF DETACHABLE CARGO CONTAINER TYPE TRAILERS

This application is a division of application Ser. No. 69,563, filed Aug. 24, 1979 now abandoned.

BACKGROUND OF THE INVENTION

This invention relates to trailers of the detachable cargo type, and more particularly to a method and system for storing the wheeled frame after removal of the storage container.

After removal of the detachable cargo container from the wheeled frame, at a railroad or ship loading site, it has been the practice heretofore that the wheeled frame is left at the site in its normal, wheel-supported horizontal position. Although some effort generally is made to leave the frames in a location which minimizes interference with normal movement of trucks and other vehicles at the site, the large numbers of wheeled frames so stored necessarily take up an excessive amount of valuable space, while also presenting obstacles to normal traffic. Moreover, since they are unconfined and readily accessible, they are easily stolen.

SUMMARY OF THE INVENTION

In its basic concept, this invention provides for wheeled frames of detachable cargo container type trailers a method and system by which such wheeled trailer frames may be picked up, swung to vertical position and deposited in a storage unit arranged to retain the trailer frame in said vertical position.

It is by virtue of the foregoing basic concept that the principal objective of this invention is achieved; namely, to provide a storage method and system by which to overcome the aforementioned disadvantages and limitations of prior storage practices.

Another object of this invention is to provide a storage system of the class described in which the mechanism for picking up such frames and swinging them to vertical position is capable of attachment to a conventional tractor or fork lift truck.

Still another object of this invention is the provision of a storage system of the class described in which the storage unit is of simplified construction for easy transport in disassembled condition and for assembly at the site with speed and facility.

The foregoing and other objects and advantages of this invention will appear from the following detailed description, taken in connection with the accompanying drawings of a preferred embodiment.

BRIEF DESCRIPTION OF THE DRAWINGS

FIG. 5 is a front elevation as viewed from the left in FIG. 3.

FIG. 6 is a front elevation, similar to FIG. 5 but on a reduced scale, illustrating the manner of supporting for storage a plurality of wheeled frames of detachable cargo container type trailers.

FIG. 7 is a foreshortened side elevation as viewed from the right in FIG. 6.

DESCRIPTION OF THE PREFERRED EMBODIMENT

Figure 1:
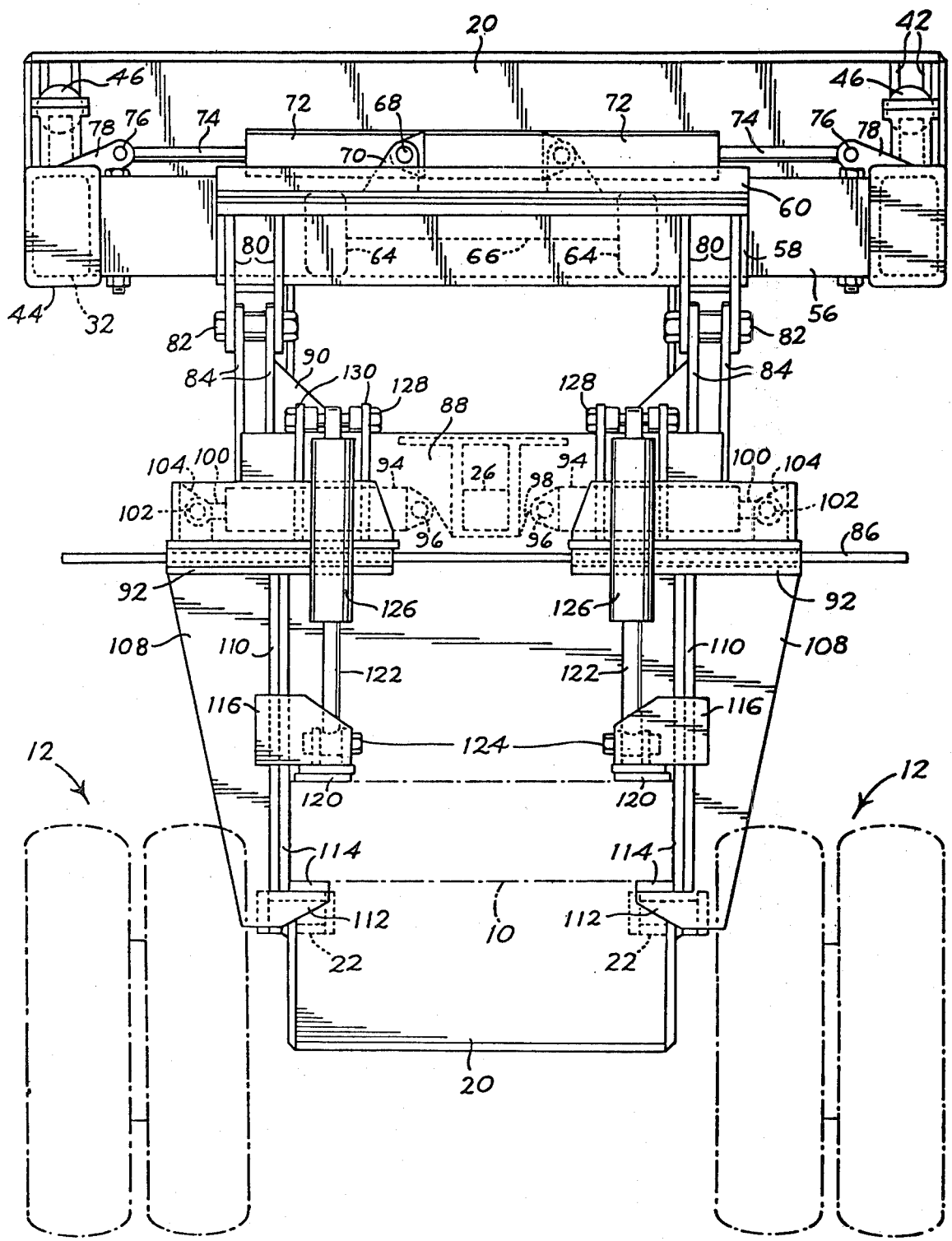
FIG. 1 is a front vertical elevation of a trailer frame carrying unit forming a part of the storage system of this invention.

FIGS. 1, 2, 6 and 7 illustrate a typical wheeled frame of a detachable cargo container type trailer. It includes an elongated frame 10 supported at its rearward end by a tandem axle dual wheel assembly 12. As is well known, the tandem axle assembly is adjustable longitudinally of the frame to selected load bearing positions, to comply with various highway regulations. The forward end of the frame supports a fifth wheel mounting assembly 14 for coupling to a powered tractor. A pair of laterally spaced, vertically adjustable jacks 16 extend downward from the forward portion of the frame to support the latter in substantially horizontal position when uncoupled from the tractor. Transverse frame members 18 serve to mount a detachable cargo container (not shown).

The storage system of this invention includes a frame carrying unit by which a wheeled frame is gripped, elevated above the ground and pivoted from its normal horizontal disposition to a vertical position, and then transported to a storage unit.

Figure 2:
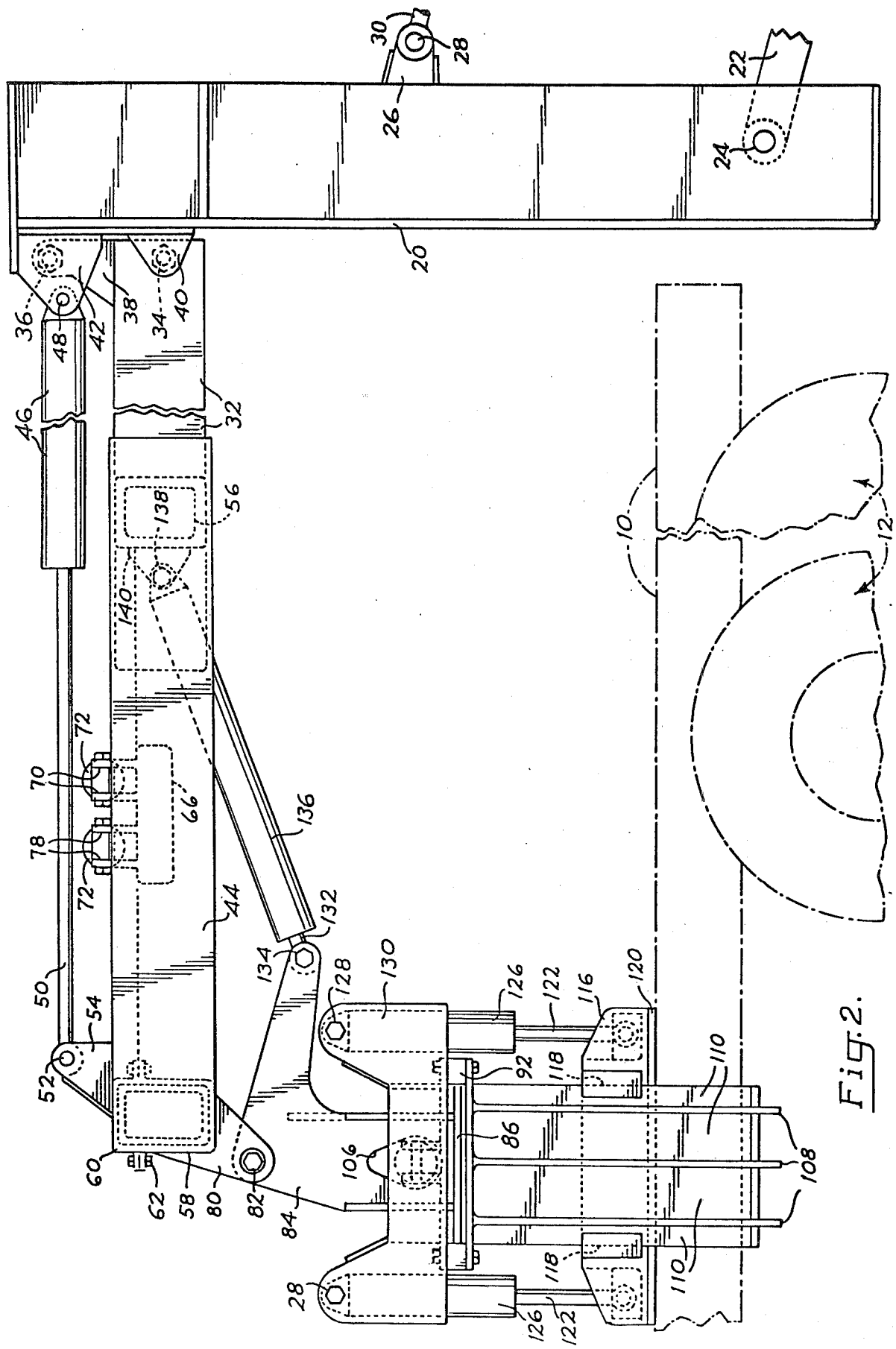
FIG. 2 is a foreshortened side elevation as viewed from the right in FIG. 1.

Referring to FIGS. 1 and 2 of the drawings, the carrying unit includes a mounting frame 20 adapted for attachment to the elevating mechanism of a tractor or lift truck. As illustrated, the mounting frame is connected to the three point suspension of a tractor. Thus, a pair of laterally spaced lifting arms 22 on the tractor are connected at their outer ends to laterally spaced positions on the lower portion of the frame 20 by means of pivot shafts 24. As is well known, the rearward ends of the arms are mounted pivotally on the tractor, and power means is provided for pivoting the arms about their rearward pivots, to achieve vertical adjustment of the forward ends of the arms. Thus, the mounting frame 20 may be raised and lowered by pivotal opoperation of the arms.

A central bracket 26, projecting rearwardly from the frame 20 above the pivot shafts 24, mounts a pivot shaft 28 which connects the forward end of an extensible hydraulic piston-cylinder tilting unit 30. This unit is connected at its rearward end to the tractor. Thus, by extension and contraction of the piston-cylinder unit, the mounting frame may be tilted relative to a vertical plane.

The mounting frame 20 mounts a pair of laterally spaced, forwardly projecting telescoping boom assemblies. Each assembly includes a rearward boom section 32 secured to the front face of the mounting frame 20 by means of anchor bolts 34 and 36 extending through the boom section 32 and boom flange 38, respectively, and anchored in brackets 40 and 42 projecting forwardly from the mounting frame.

Each boom assembly also includes a forward boom section 44 the rearward end of which is slidably received over the forward end of the associated rear section boom. An extensible hydraulic piston-cylinder unit is associated with each boom assembly for extending and contracting it. As illustrated, the cylinder 46 of the unit is connected at its rearward end to the forwardly projecting end of the brackets 42 by means of a pivot shaft 48. The forward end of the piston rod 50 of the unit is connected by a pivot shaft 52 to a pair of brackets 54 projecting upwardly from the forward end of the forward boom section. Thus, by selective application of hydraulic fluid under pressure to the opposite ends of the cylinder 46, the forward boom section is extended and retracted relative to the rear boom section.

It is to be understood that hydraulic fluid under pressure is delivered to both cylinders 46 simultaneously from a common source to insure simultaneous and equal movement of both forward boom sections.

Extending transversely between the front and rear ends of the pair of forward boom sections 44 are a pair of guide beams 56 for a transversely movable carriage. As illustrated, the carriage comprises front and rear sleeves mounted freely on the guide beams for movement relative thereto. Each sleeve is made up of bottom and top U-shaped sections 58 and 60 joined together releasably by bolts 62 extending through mating flanges on the sections. The front and rear sleeves are interconnected by longitudinally extending, laterally spaced beams 64 which are secured at their ends to the sleeves.

Power means is provided for adjusting the carriage laterally along the guide beams. As illustrated, a support plate 66 extends transversely between the side beams 64 of the carriage and mounts the inner end of each of a pair of hydraulic piston-cylinder units. This is achieved by a pivot shaft 68 extending through a pair of spaced flanges 70 projecting upwardly from the support plate 66. The pivot shaft mounts the inner end of one of the pair of cylinders 72 which are disposed side-by-side and extend laterally in opposite directions. The piston rod 74 of the associated cylinder is connecged pivotally by a pivot shaft 76 to a pair of spaced flanges 78 secured to the forward telescoping boom section 44 of one of the boom assemblies. The piston rod of the other cylinder is connected in similar manner to the forward boom section of the other boom assembly.

Hydraulic fluid under pressure is supplied selectively to the opposite ends of the cylinders 72 in such manner as to move the carriage laterally in one direction or the other. By the arrangement illustrated, hydraulic fluid is delivered simultaneously to the piston rod end of one of the cylinders and the piston end of the other cylinder in both directions of movement of the carriage. This insures uniform speed of movement of the carriage in both directions of movement of the carriage.

A pair of brackets 80 project downward from each of the lateral ends of the front bottom sleeve section 58 of the carriage, for mounting a pivot bolt 82. Each pivot bolt supports a bell crank lever made of a pair of spaced lever plates 84 joined together by an intermediate web. The lower ends of these bell crank lever plates are secured to a transversely elongated guide plate 86, the latter being reinforced for structural rigidity by transversely extending reinforcing plate 88 and flanges 90.

Mounted upon the guide plate 86 for lateral adjustment relative thereto are a pair of clamp jaw carriages 92. Each is moved laterally by means of an hydraulic piston-cylinder unit. As illustrated, the inner end of the cylinder 94 of each unit is connected by a pivot shaft 96 to a pair of brackets 98 secured to the guide plate. The outer end of the piston rod 100 of the associated unit is connected by a pivot shaft 102 to a pair of brackets 104 secured to the associated clamp carriage 92. Openings 106 in the bell crank lever plates 84 receive the cylinders freely therethrough.

Projecting downward from each of the clamp jaw carriages is an elongated clamp arm. As illustrated, each clamp arm is made of a plurality of plates 108 spaced apart by reinforcing webs 110 (FIG. 2). At the lower end of each clamp arm is secured an inwardly projecting clamp jaw plate 112. The upper surface of the jaw plate and a confronting inner vertical surface of the clamp arm mounts rubber pads 114 to provide protective and gripping surfaces.

Associated cooperatively with each of the fixed clamp jaws 112 is a vertically adjustable clamp jaw. It includes an elongated jaw frame 116 positioned across the inner surface of the clamp arm and provided with spaced guide grooves 118 slidably receiving the ends of the vertical webs 110 of the associated clamp arm. Its under surface mounts a rubber pad 120.

The downwardly projecting ends of the piston rods 122 of a pair of hydraulic piston-cylinder units are connected to the lateral ends of each jaw frame 116 by means of pivot bolts 124. The ends of the associated hydraulic cylinders 126 of the units opposite the piston rods are connected by pivot bolts 128 to the lateral ends of a pair of spaced flanges 130 projecting upwardly from the associated clamp jaw carriage 92.

As illustrated, the vertically adjustable clamp jaw frame 116 is about twice the width of the fixed clamp jaw 112. This provides a wide clamping area for gripping a trailer frame 10.

The clamping assembly is adjustable from the trailer lifting arrangement illustrated in FIG. 2 to a trailer transport position extending forwardly of the boom assembly, by simultaneous clockwise rotation of the pair of laterally spaced bell crank lever assemblies 84 about their common pivot axis provided by the pivot bolts 82. This movement of each of the bell crank lever assemblies is provided by an hydraulic piston-cylinder unit interconnecting the associated bell crank lever assembly and its carriage 92. As illustrated, the piston rod 132 of each unit is connected to the rearward end of the bell crank lever assembly by means of a pivot bolt 134. The end of the associated cylinder 136 opposite the piston rod is connected by a pivot bolt 138 to a pair of brackets 140 secured to and projecting forwardly from the rearward transverse sleeve section 58 of the carriage. It is to be understood, of course, that hydraulic fluid under pressure is delivered to the pair of cylinders 136 simultaneously from a common source in order to effect simultaneous and equal pivoting movement of the pair of bell crank lever assemblies.

The operation of the frame-carrying unit described hereinbefore is as follows: Let it be assumed that the unit is mounted on the front end of a tractor, by means of the three point connection provided by the arms 22 and piston-cylinder unit 30 (FIG. 2) and that the unit has just deposited a trailer in a storage compartment. Hydraulic fluid under pressure is delivered to the cylinders 136 to retract the piston rods 132 and thus pivot the bell crank lever assemblies counterclockwise about the axis of their pivot bolts 82, to dispose the clamping assembly in the lowered, lifting position illustrated in FIG. 2. Hydraulic fluid under pressure also is applied to the cylinders 126 to retract the latter and the attached clamping jaws 116 upwardly to maximum distance from the fixed jaws 112 of the associated units. Hydraulic fluid under pressure also is applied to the cylinders 94 to move the carriages 92 and the opposed clamp jaws farther apart than the width of the trailer frame to be clamped. The arms 22 and unit 30 are operated to raise or tilt the frame 20 sufficiently to elevate the clamp jaws above the tires 12 of a trailer frame 10 to be transported to storage.

The tractor then is manipulated into position behind and in substantially longitudinal alignment with the trailer frame 10.

On the assumption that the telescoping boom assembly was fully retracted at the start, hydraulic fluid under pressure is supplied to the cylinders 46 in a direction to extend the telescoping boom assembly sufficiently forward of the mounting frame 20 to enable the clamp arms to engage the trailer frame 10 forwardly of the tandem wheel assembly 12.

The frame 20 now is moved, by manipulation of the arms 22 or unit 30, to lower the clamp jaws to the position illustrated in FIG. 2. The cylinders 94 are operated to move the carriages 92 and the clamp jaws toward each other until they are closely adjacent the opposite side of the trailer frame.

In the event the clamp jaws are offset laterally to one side or the other relative to the longitudinal center line of the trailer frame, hydraulic fluid under pressure is applied to the appropriate ends of the cylinders 72 to move the carriage along the guide beams 56 in the direction to center the clamp assemblies.

The lifting arms 22 on the tractor now are operated to move the entire assembly vertically upward until the lower, fixed clamp jaws 112 are brought into abutment with the underside of the trailer frame 10. The carriages 92 are operated once again to move the side rubber pads 120 into abutment with the sides of the trailer frame. Hydraulic fluid under pressure is supplied to the cylinders 126 to move the associated clamping jaws 116 downwardly until their associated rubber pads 120 are brought into clamping abutment with the upper surface of the trailer frame. The trailer frame thus is clamped securely between the fixed jaws and vertically movable jaws, at the appropriate position forwardly of the tandem wheels 12.

The mounting frame 20 now is raised vertically, by operation of the lifting arms 22, to elevate the clamped trailer frame sufficiently above ground level to allow swinging it from the horizontal position of FIG. 2 to a substantially vertical position forwardly of the telescoping boom assembly. This is achieved by applying hydraulic fluid under pressure to the rearward ends of the cylinders 136 connected to the bell crank levers 84.

With the trailer frame disposed in vertical position, the telescoping boom assembly is contracted to minimum length, by application of hydraulic fluid under pressure to the forward ends of the cylinders 46, to maximize the stability of the tractor and carrying unit, preparatory to transport of the trailer to the storage unit.

The preferred form of storage unit is illustrated in FIGS. 3-7. It includes a pair of laterally spaced side walls in the form of open frameworks. Thus, each includes a longitudinal base beam 142, a longitudinal top beam 144 and a plurality of longitudinally spaced vertical beams 146 interconnecting them. Diagonal brace beams 148 may be provided, extending between adjacent vertical beams, to increase the structural stability of the framework.

The pair of laterally spaced side walls are connected together at their bottom and top rear ends by transverse bottom and top rear beams 150 and 152. These beams interconnect the rear terminal ends of the bottom and top side wall beams 142 and 144. These interconnections preferably are made detachable to enable the components of the storage unit to be transported in disassembled condition to the site of use. To this end the connections are made by connecting pins 154 extending removably through registering openings in lapping flanges 156 on the beams. The beams 150 and 152 are joined at their ends by vertical beams 158.

Adjacent the front end of the side walls is a transverse plate 160 secured at its opposite ends to the bottom side walls beams 142. The side walls thus are secured in parallel condition.

Extending inwardly from the top beam 144 of each of the side walls are a plurality of longitudinally spaced horizontal beams 162. The inner ends of these latter beams support a pair of laterally spaced longitudinal guide beams 164. The rearward ends of these beams are connected detachably to the upper rear transverse beams 152, by means of removable connecting pins 166 which extend through registering openings in lapping brackets 168 extending from the beams in the same manner as the pinned connections of the lapping flanges 156 on the top and bottom rear end beams.

The space between the guide beams 164 provides a central channel for the passage of a vehicle frame 10 disposed in the vertical position discussed hereinbefore.

Means is provided for forming the framework structure into a plurality of longitudinally disposed compartments each adapted to receive and store a wheeled trailer frame. For this purpose, as illustrated, a plurality of pairs of containment gates 170 are positioned at longitudinally spaced intervals along the length of the framework structure for extension and retraction relative to the central channel defined by the guide beams 164. Each pair of containment gates thus forms with the side wall of the framework structure a compartment in which to contain a trailer frame.

Each of the containment gates of each pair illustrated comprises a pair of longitudinally spaced and laterally extending rods or tubes 172 telescoped slidably within associated guide tubes 174. These tubes are secured to and span the top beams 144 and adjacent guide beams 164. The inner ends of the tubes 172 of each pair are joined together by a bar 176.

Figure 3:
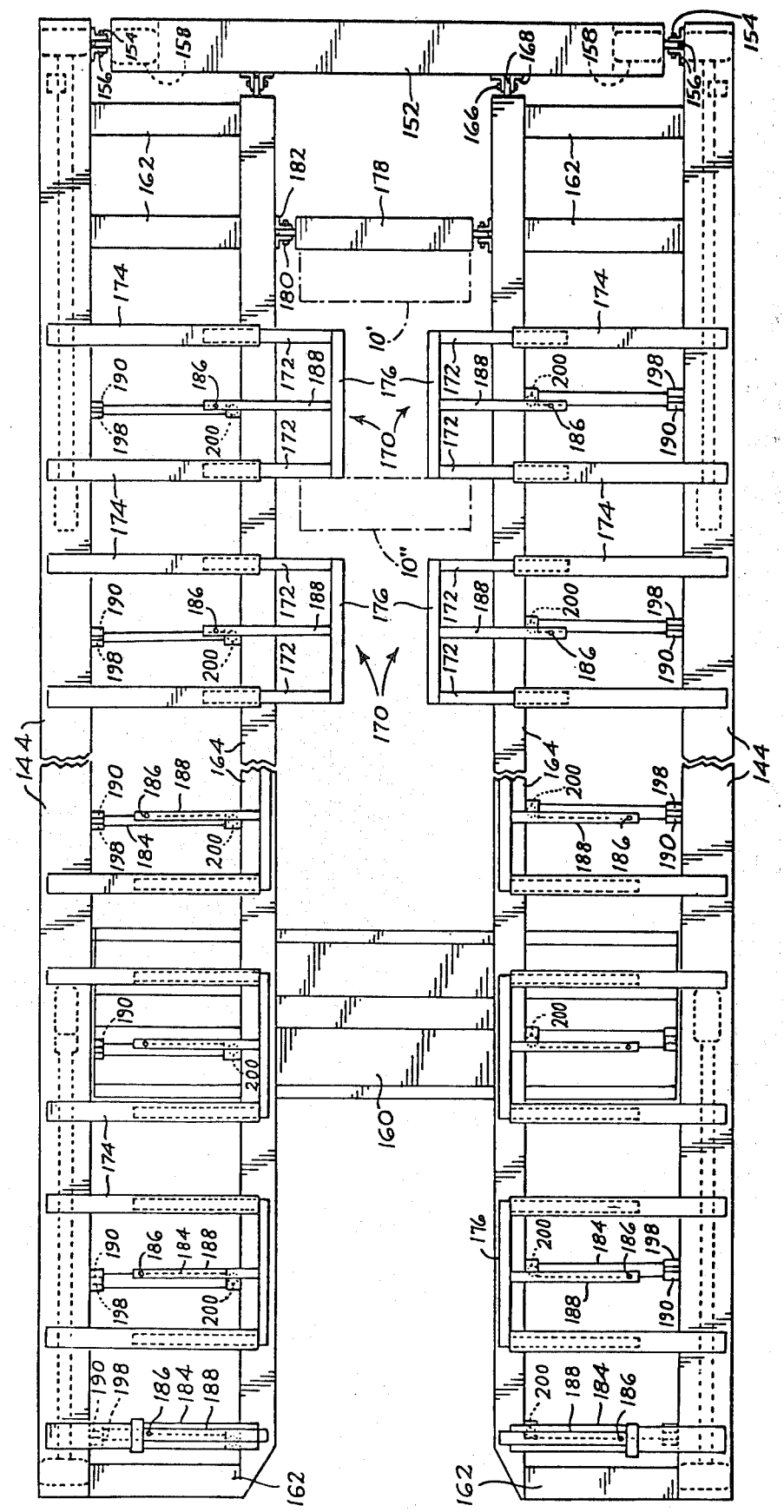
FIG. 3 is a foreshortened plan view of a storage unit forming a part of the storage system of this invention.
Figure 4:
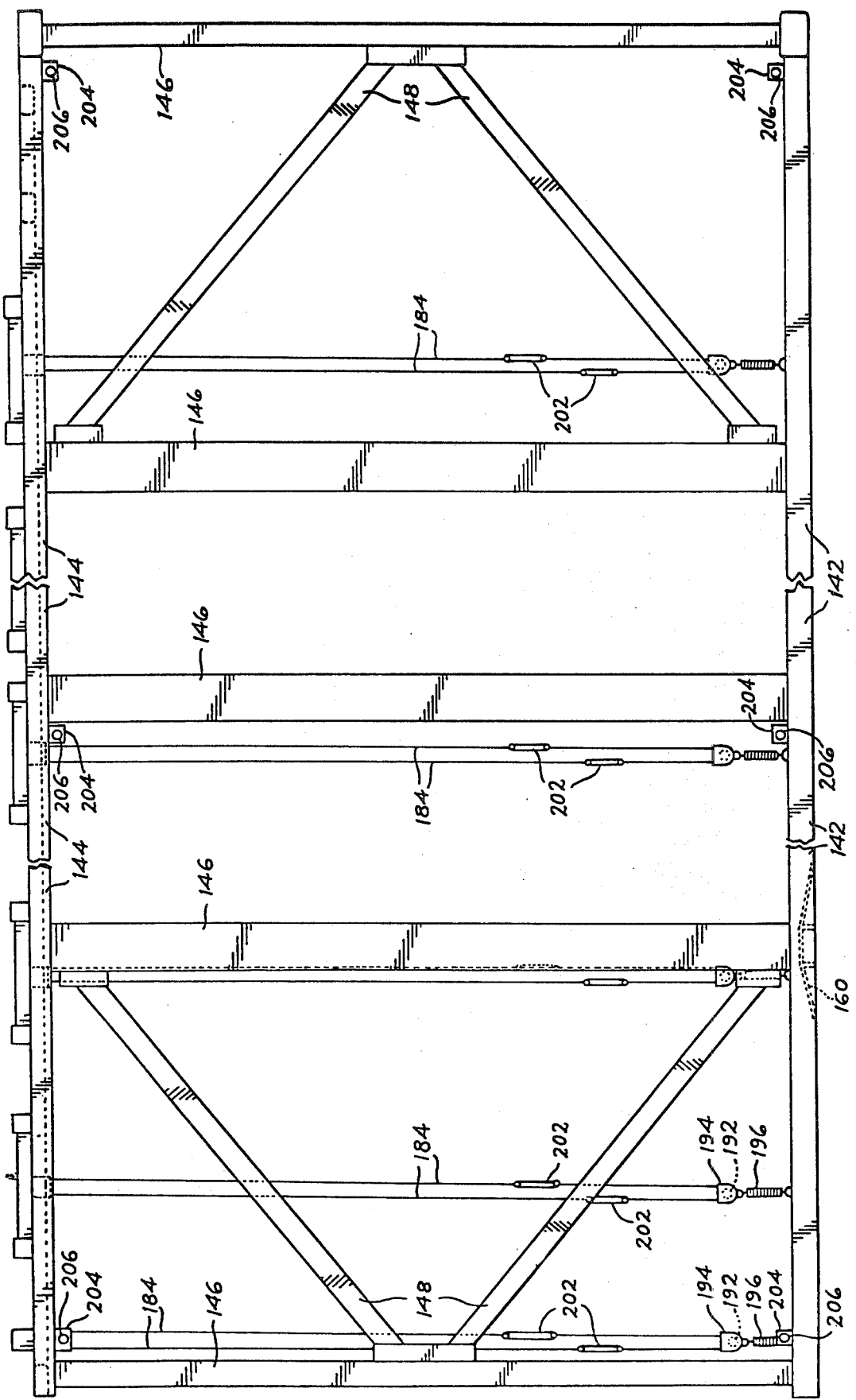
FIG. 4 is a foreshortened side elevation as viewed from the bottom in FIG. 3.

It is to be observed, particularly from FIG. 3, that the containment gates of each pair may be retracted laterally outward, by telescoping the tubes 172 within the guide tubes 174, so that the central channel defined by the guide beams 164 is uninterrupted, whereby to allow the passage of a trailer frame 10 along the channel. Thus, the first trailer frame is moved by the tractor, as in the foregoing illustration, to the rearwardmost position, to the far right in FIG. 3 for deposit in the rearwardmost compartment. The pair of containment gates associates with said compartment then are extended laterally inward to the position illustrated, by with withdrawing the tubes 172 laterally inward from the guide tubes 174. The containment gates thus intercept the central channel defined by the guide beams 164 to present an obstructing gate which prevents retraction of the trailer frame in the forward direction along the central channel. Thus, the pair of containment gates form with the associated side walls of the storage unit a storage compartment for the trailer frame.

Referring to FIG. 3, the rearwardmost compartment also is provided with a transverse beam 178 which extends across the central channel and is secured at its opposite ends to the laterally spaced guide beams 164. In the preferred embodiment illustrated, releasable connection of this transverse beam to the guide beams is provided by connecting pins 180 extending through registering openings in lapping brackets 182, in the manner previously described.

The transverse beam 178 thus provided in the rearwardmost compartment of the storage unit, provides an abutment for the vehicle frame 10 contained within that compartment. With reference to FIG. 7 of the drawings, it is to be noted that the vertically disposed trailer frame rests at its rearward end upon the ground, with the tandem wheel assembly located rearwardly. The center of gravity of the vertically disposed vehicle frame thus is located toward the right of the longitudinal center line of the frame 10, whereby to cause the frame to swing clockwise about its rearward end as a pivot axis. Accordingly, the vehicle frame 10 swings into abutment with the transverse beam 178.

FIG. 3 also illustrates the formation of the next adjacent rearward compartment, by inward extension of the next adjacent pair of containment gates. The second rearwardmost vertically disposed trailer frame thus contained within the second compartment, swings clockwise into abutment with the forwardly facing end of the first pair of containment gates, as illustrated.

From the foregoing, it will be understood that trailer frames are introduced into the storage unit and deposited one at a time successively from the rearwardmost compartment to the forwardmost compartment. Removal of the trailer frames is accomplished in the reverse order; namely, one at a time from the forwardmost compartment to the rearwardmost compartment.

Means is provided for moving each of the containment gates between extended and retracted positions. In the embodiment illustrated, such means is provided by a manually operable endless cable 184 or other suitable form of flexible line. The cable is secured at one point 186 to the laterally outward end of a bar 188 which extends laterally outward from the connecting bar 176 which joins the inner ends of the pair of tubes 172. The cable extends from the anchor point 186 laterally outward and over a pulley 190 mounted on the associated side wall, thence downward (FIG. 4) over a pulley 192 carried by a housing 194 anchored through a spring 196 to the base beam 142 of the side wall, thence upward from the pulley and over a second pulley 198 mounted on the side wall adjacent the first named pulley 190, thence laterally inward and over a pulley 200 mounted on the guide beam 164, and thence to the anchor point 186.

If desired, one or more turnbuckles 202 may be interposed in the cable 184 to accommodate tension adjustments, as will be understood.

From the foregoing, it will be understood that downward pulling on one of the vertical stretches of the cable will result in extension of the associated containment gate laterally inward to intercept the central channel, while downward pulling on the other vertical section of the cable will result in reaction of the containment gate laterally outward of the central channel.

It is to be noted from FIG. 5 of the drawings, that the internal width of the storage unit between the side walls is sufficient not only to receive the width of the trailer frames 10 to be stored, but also the width of the tractor carrying the trailer frame. The height of the storage unit from the base beams 142 to the top beams 144 is approximately 17 feet, whereby also to accommodate the height of the tractor. FIGS. 6 and 7 illustrate the storage system functioning to store trailer frames which are, characteristically, about 40 feet in length. A storage unit of about 50 feet in length is capable of storing ten such trailer frames.

A plurality of storage units may be connected together side-by-side. For this purpose a plurality of longitudinally spaced tabs 204 are provided along the length of the bottom and top beams 142 and 144 and each is provided with an opening 206 for the reception of a connecting bolt. Such bolts extend through registering openings in pairs of such tabs of adjacent storage units.

It will be apparent to those skilled in the art that various changes may be made in the size, shape, type, number and arrangement of parts described hereinbefore, without departing from the spirit of this invention.

Having now described my invention and the manner in which it may be used, I claim:

1. The method of storing the empty elongated wheeled frame of a trailer of the detachable cargo container type wherein the trailer frame has a top trailer-supporting surface and an opposite bottom surface and laterally spaced longitudinal sides and the wheels are mounted on the frame adjacent the rear end thereof, the method comprising:
   (a) uncoupling said trailer frame from a powered tractor,
   (b) gripping the trailer frame between the said top and bottom surfaces at least in areas adjacent both laterally spaced sides of the frame and forwardly of the wheels as the frame is supported on the ground in substantially horizontal position,
   (c) lifting the frame above the ground,
   (d) rotating the lifted frame to substantially vertically extending position with the rear end facing downward,
   (e) moving the vertically extending frame to a storage site, and
   (f) supporting the frame removably in stationary storage in said substantially vertically extending position.

2. The method of claim 1 wherein the supporting of the frame removably in storage is effected by lowering the substantially vertically extending frame to a ground position resting upon its rear end and with an upper portion of the frame resting against a support elevated above ground.

3. The method of claim 2 for storing a plurality of said trailer frame, including:
   (a) providing a plurality of storage compartments arranged end-to-end from a closed end to an open, access end, each compartment having a support elevated above ground, and
   (b) depositing the frames one at a time in each compartment sequentially from the closed end toward the open end with the top container-supporting surfaces of the frames being disposed substantially perpendicular to the longitudinal direction of the plurality of storage compartments extending between said closed and opened ends.

4. The method of claim 1 wherein the frame is gripped between the said top and bottom surfaces at the opposite lateral sides of the frame.

5. The method of claim 1 including removing the frame from storage for trailering use, by:
   (a) gripping the trailer frame between the said top and bottom surfaces forwardly of the wheels as the frame is supported in storage in said substantially vertically extending position,
   (b) moving the frame away from the storage site,
   (c) rotating the frame to substantially horizontally extending position,
   (d) lowering the substantially horizontally extending frame to the ground, resting upon its wheels, and
   (e) releasing the grip on the trailer frame.

* * * * *